United States Patent [19]
Paine, Jr. et al.

[11] Patent Number: 5,204,295
[45] Date of Patent: Apr. 20, 1993

[54] PRECURSORS FOR BORON NITRIDE COATINGS

[75] Inventors: Robert T. Paine, Jr., Albuquerque, N. Mex.; Chaitanya K. Narula, Ann Arbor, Mich.; Riley O. Schaeffer, Boulder, Colo.; David A. Lindquist; Theodore T. Borek, III, both of Albuquerque, N. Mex.

[73] Assignee: University of New Mexico, Albuquerque, N. Mex.

[21] Appl. No.: 725,933

[22] Filed: Jun. 27, 1991

Related U.S. Application Data

[63] Continuation of Ser. No. 312,956, Feb. 17, 1989, abandoned.

[51] Int. Cl.$^5$ .............................................. C04B 35/56
[52] U.S. Cl. ...................................... 501/96; 423/290
[58] Field of Search ................. 501/96; 423/290, 283, 423/285; 528/33, 294; 106/287.1, 287.3, 287.11, 287.32

[56] References Cited

U.S. PATENT DOCUMENTS

| | | | |
|---|---|---|---|
| 3,288,726 | 11/1966 | Wagner et al. | 260/2 |
| 3,321,337 | 5/1967 | Patterson | 148/6.3 |
| 3,345,396 | 10/1967 | Horn et al. | 260/462 |
| 3,382,279 | 5/1968 | Horn et al. | 260/551 |
| 3,392,181 | 7/1968 | Horn | 260/448.2 |
| 3,578,403 | 5/1971 | Moore | 21/6 |
| 4,361,543 | 11/1982 | Zhdanovich et al. | 423/290 |
| 4,545,968 | 10/1985 | Hirano et al. | 423/290 |
| 4,581,468 | 4/1986 | Paciorek et al. | 556/403 |
| 4,590,034 | 5/1986 | Hirano et al. | 419/14 |
| 4,655,893 | 4/1987 | Beale | 204/192.15 |
| 4,707,556 | 11/1987 | Paciorek et al. | 556/403 |
| 4,731,437 | 3/1988 | Taniguchi et al. | 528/394 |
| 4,801,439 | 1/1989 | Blum et al. | 423/285 |
| 4,865,830 | 9/1989 | Klabunde et al. | 423/290 |
| 4,906,763 | 3/1990 | Paciorek et al. | 528/12 |
| 4,971,779 | 11/1990 | Paine, Jr. et al. | 423/290 |

OTHER PUBLICATIONS

"New Precursors to Boron-Nitrogen Macromolecules and Ceramics", by C. K. Narula, et al., *Mat. Res. Soc. Meeting* Abstract, 1986 Spring Meeting.

"Synthesis of Boron Nitride Ceramics from Poly(borazinylamine) Precursors" by Chaitanya K. Narula, et al, *Journal of the American Chemical Society*, vol. 109, p. 5556 (1987).

"Boron Nitride and Its Precursors" by K. J. L. Paciorek, et al, American Chemical Society publ. No. 0097-6156/88/0360-0392 (1988).

"Preparation and Characterization of thin Protective Films in Silica Tubes by Thermal Decomposition of Hexachloroborazine" by G. Constant et al, *Journal of the Less-Common Metals*, vol. 82, pp. 113-118 (1981).

"Chemical Vapour Deposition of Thin Films of BN Onto Fused Silica and Sapphire" by M. Sano, et al. *Thin Solid Films* vol. 83, pp. 247-251, (1981). "Chemical Vapor Deposition of Hexagonal Boron Nitride Think Film on Iron" by T. Takahashi, et al, *Journal of Crystal Growth*, vol. 47, pp. 245-250 (1979).

"Preparation and Properties of Thin Film Boron Nitride" by M. J. Rand, et al, *Journal Elect. Chem Soc.*, vol. 115, p. 423 (1968).

"Boron Nitride Composites by Chemical Vapor Deposition" by H. O. Pierson; *J. Composite Materials*, vol. 9, p. 228 (Jul. 1975).

"Evaluation of Potential BN Polymer Precursors" by B. A. Bender et al *Ceram. Eng. Sci. Proc*, vol. 6 pp. 1171-1183 (1985).

(List continued on next page.)

Primary Examiner—Mark L. Bell
Assistant Examiner—Alan Wright
Attorney, Agent, or Firm—Deborah A. Peacock; Jeffrey D. Myers

[57] ABSTRACT

The disclosure is directed to compositions and methods for forming boron nitride coatings, using polymers derived from tri-substituted borazine and chloroborazine compounds. The polymeric compounds are mixed with ammonia, pyrolized at high temperatures to obtain a high temperature melt, and further converted to boron nitride coatings on various substrates. The polymeric compounds can be stored prior to pyrolysis.

31 Claims, No Drawings

"Boron–Nitrogen Polymers. I. Mechanistic Studies of Borazine Pyrolyses" by K. J. L. Paciorek, et al. *Journal of Polymer Science: Polymer Chem Ed.* vol. 24, pp. 173–185 (1986).

"Borazine Polymers, B–N Linked Borazine Rings and Polyborazylene Oxides" by Ross I. Wagner, et al *Inorganic Chemistry*, vol. 1, No. 1, pp. 99–106 (Feb. 1962).

"Preparation, Properties and Applications of Boron Nitride Thin Films" by S. P. S. Arya et al *Thin Solid Films*, vol. 157, pp. 267–282 (1988).

"Inorganic and Organometallic Polymers" by Martel Zeldin, et al *American Chemical Society*, Symposium Ser. 360, pp. 378–384 (Jan. 7, 1988).

Abstract: "Boron Nitride Preceramic polymers" by Paciorek, et al, *Textiles* vol. 105, No. 80546 (1986).

Abstract: "Study of borazine condensation processes" by Paciorek, et al *Organometallics*, vol. 101, p. 641 (1984).

Abstract: "B–N linked borazines" by Ross I. Wagner *Synthetic High Polymers*, vol. 66, p. 3685 (1967).

Abstract: "Boron–nitrogen polymers" by Paciorek, et al.

Abstract: "Boron nitride in filament, film or other forms" by Taniguchi, et al., *Industrial Inorganics*, vol. 85, No. 96582 (1976).

Abstract: "Substituted borazine polymers as precursors for boron nitride ceramics" by Paciorek, et al *Chemical Abstracts*, vol. 108, p. 322 (1988).

*Z. Naturforsch*, vol. 33b pp. "About the Formation of Macrocyclic B–N Compounds" by A. Meller et al, 156–158 (1978).

PRECURSORS FOR BORON NITRIDE COATINGS

This application is a continuation of application Ser. No. 07/312,956, filed Feb. 17, 1989, now abandoned.

BACKGROUND OF THE INVENTION

Cross Reference to a Related Application

A related application entitled PRECURSORS FOR BORON NITRIDE CERAMICS, U.S. Ser. No. 07/312,881 now U.S. Pat. No. 4,971,779 issued Nov. 20, 1990, to Paine, et al., the specification thereof is incorporated herein by reference.

FIELD OF THE INVENTION

This invention relates to monomer and polymer precursors useful for the application of boron nitride (BN) coatings on articles.

DESCRIPTION OF THE RELATED ART

In the past, thin films of amorphous and crystalline hexagonal boron nitride have been produced on metallic and metal oxide substrates by chemical vapor deposition (CVD), plasma vapor deposition (PVD), and related gas phase deposition techniques. These preparative routes have recently been reviewed by Arya and D'Amico, *Thin Solid Films*, Vol. 157, p. 267 (1988). For example, CVD preparations of boron nitride (BN) with diborane ($B_2H_6$) and ammonia ($NH_3$) mixtures have been reported by Hyder, et al., *J. Electrochem. Soc.*, Vol. 123 p. 1721 (1976); Rand, et al., *J. Electrochem. Soc.*, Vol. 115, p. 423 (1968); Hirayama, et al., *J. Electrochem. Soc.*, Vol. 122, p. 1671 (1975); and Murarka, et al., *J. Electrochem. Soc.*, Vol. 126, p. 1951 (1979). Similarly, boron halides ($BF_3$ and $BCl_3$) and ammonia mixtures have been used by Pierson, H. O., *J. Composite Mater.*, Vol. 9, p. 228 (1975); Powell, et al., "Vapor Deposition," Wiley, N.Y., p. 663 (1962); Sano, et al., *Thin Solid Films*, Vol. 83, p. 247 (1981); Gebhardt, et al., 4th Int. Conf. on Chem. Vapor Deposition, Boston 1973, Electrochemical Society, Princeton, N.J. (1973), p. 460; Clerc, et al., Proc. 5th Int. Conf. on Chem. Vapor Deposition, Slough 1975, Electrochemical Society, Princeton, N.J., p. 777 (1975); and Takahashi, et al., *J. Cryst. Growth*, Vol. 47, p. 245 (1979) to prepare boron nitride films. In a few instances, single molecular precursors, which contain both the boron and nitrogen atoms in fixed stoichiometric proportions, have been utilized in gas phase deposition processes. For example, Adams, *J. Electrochem. Soc.*, Vol. 128, p. 1379 (1981) and Patterson, U.S. Pat. No. 3,321,337, entitled "Process for Preparing Nitride Coatings" and Patterson, et al., Abstr. Electrochemical Soc., Pittsburgh, 1963, have reported preparation of hexagonal boron nitride on several substrates from borazine $(HBNH)_3$ and trichlorobronzine $(ClBNH)_3$, and Constant and Feurer, *J. Less-Common Metals*, Vol. 82, p. 113 (1981) have reported formation of boron nitride from hexachlorobroazine $(ClBNCl)_3$. These and other related CVD processes produce boron nitride coatings that are adequate for some technical applications; however, the processes and/or coatings often suffer from several disadvantages. In particular, vapor deposition techniques that employ two component chemical feedstocks (e.g., volatile borane plus $NH_3$) are complicated by the degree of experimental control and care that must be exercised in metering the two reactive gases. Without great care, variable ceramic product compositions are obtained. Reaction mixtures that carry significant quantities of halides in the feedstock reagents typically result in halide contaminated films. Further, substrate temperature control in these systems is critical. In particular, many films obtained by vapor deposition processes are amorphous rather than crystalline, and the properties of amorphous films are not as desirable in some applications as the properties of crystalline boron nitride films. Some additional experimental shortcomings of classical CVD processed boron nitride are summarized in the '337 Patterson patent.

It has been shown that fine ceramic powders may be conveniently prepared by pyrolysis of appropriately constructed inorganic polymers (K. J. Wayne and R. W. Rice, *Ann. Rev. Mater. Sci.* Vol. 14, p. 297 (1984)); however, little progress has been made in applying this approach to the production of crystalline non-oxide coatings. Taniguchi, et al., Jpn. Kokai 76 53,000, May 11, 1976, reported pyrolysis of several borazine monomers as a preparative route to boron nitride, and in the case of one monomer, B-triamino-N-phenyl borazine $[H_2NBN(C_6H_5)]_3$, it was claimed that the monomer self-polymerized upon heating, and a melt obtained from the monomer at 300° C. could be drawn into fibers or formed into a film. Subsequent calcination under nitrogen produced boron nitride fibers/films. Paciorek, et al., *J. Polym. Sci.*, Vol. 24, p. 173 (1986) and *Polym. Preprints*, Vol. 25, p. 16 (1984), and others, have reported difficulty in reproducing this work. More recently, Paciorek and co-workers (see above and Paciorek, et al., *ACS Symp. Ser.*, Vol. 360, p. 392 (1988)) have reported formation of boron nitride powders from the pyrolysis of substituted borazine monomers. In one recent account (see Paciorek, et al., U.S. Pat. No. 4,581,468, issued Apr. 8, 1986), they specifically noted formation of a borazine polymer from $(H_2NBNSiR_3)_3$. Further, it was observed that this polymer melted at 125° C. to 260° C., and fibers were drawn from the melt. The fibers were pyrolyzed under $NH_3$ at 60° C. to 1000° C. for 27 days, leaving colorless boron nitride fibers. None of these studies describe the formation of crystalline hexagonal boron nitride films or coatings, and no observations of the formation of polymer melts at high temperatures (T>500° C.), as opposed to low temperatures (T<500° C.), were described. Indeed, since the primary goal of these studies was to obtain a preceramic polymer suitable for fiber drawing at the lowest possible temperature, it can be assumed that the investigators were not seeking high temperature melt forming polymers. Further, it would not normally be expected that polyborazinyl materials would melt at high temperatures (T>500° C.).

In Narula, et al., *Mat. Res. Soc. Symp. Proc.*, Vol 73, p. 383 (1986); *ACS Symp. Ser.*, Vol. 360, p. 378 (1988); and *J. Am. Chem. Soc.*, Vol. 109, p. 5556, (1987), B-trichloroborazine $(ClBNH)_3$ was dissolved in diethyl ether, in the presence of hexamethyldisilazane. Removal of the volatiles produced a white solid polymer. This polymer was heated directly to 1000° C. to 1200° C., and hexagonal boron nitride, in powder form, was obtained. In this case, the polymer did not melt before conversion to crystalline boron nitride.

Paine, et al., in U.S. Ser. No. 07/312,881, now U.S. Pat. No. 4,917,779 entitled PRECURSORS FOR BORON NITRIDE CERAMICS, issued Nov. 20, 1990, describes monomer and polymer precursors useful for the formation of boron nitride articles and coatings.

SUMMARY OF THE INVENTION

In accordance with the invention there is provided a composition suitable as a coating for pyrolytic conversion to boron nitride, a method for making this composition, and a method for using this composition on various substrates. The invention also includes intermediate precursor materials and articles coated with such materials or a final boron nitride coating. In one embodiment, the composition comprises at least one tri-substituted borazine compound. In another embodiment, the composition comprises at least one chloroborazine compound.

The tri-substituted borazine compound of the invention preferably comprises tris-dialkylamino borazine $(R_2NBNH)_3$, or tris-alkylsulfido borazine $(RSBNH)_3$, wherein R comprises an alkyl group, such as methyl, ethyl, or iso-propyl. The composition further comprises a nitrogen hydride, such as ammonia, hydrazine, and N,N' disilylhydrazine, and a solvent. The composition may further comprise a dopant.

The process of the invention for producing an initial polymer for the formation of boron nitride comprises the following steps:
  a) obtaining at least one tri-substituted borazine compound, as discussed above;
  b) dissolving the tri-substituted borazine compound in a solvent; and
  c) adding excess nitrogen hydride to the solvent mixture to produce an initial lightly cross-linked polymer for the formation of boron nitride.

The solvent is preferably organic, selected from such organic solvents as chlorocarbons, ethers, arenes, or hydrocarbons. During the process, the nitrogen hydride is added to the solvent mixture at a preferred temperature of between approximately $-80°$ C. and $25°$ C. The process may further comprise the step of filtration of the final reaction mixture produced in step c) to collect the initial lightly cross-linked solid polymers, and washing the collected initial polymers with a fresh solvent.

The initial polymers may be heated at a sufficient temperature and pressure for a sufficient time to produce a stable, lightly cross-linked, solid polymeric ceramic, which can be stored. This temperature should be at least approximately $300°$ C. to produce stable, highly cross-linked, solid polymeric ceramics. The pyrolysis may be conducted in vacuo or in the presence of a non-reactive gas.

The invention further provides a process for producing boron nitride from a polymer precursor composition comprising the following steps:
  a) obtaining the initial polymers, as set forth above, for the formation of boron nitride; and
  b) pyrolizing the initial polymers at a sufficient temperature and pressure for a sufficient time to form amorphous boron nitride, crystalline alpha boron nitride (a temperature of at least approximately $1200°$ C.), and crystalline beta boron nitride, such as in the presence of a catalyst or by adding the catalyst to the reaction mixture prior to pyrolysis. The resulting boron nitride composition may be carbon free.

The invention further provides a process of using polymer precursors for the formation of a boron nitride coating on an article comprising the following steps:
  a) obtaining the initial polymers, as set forth above;
  b) heating initial polymers at a sufficient temperature and pressure for a sufficient time to form stable, highly cross-linked polymers; and
  c) coating the article with the stable, highly cross-linked polymers.

The article may comprise oxides, non-oxides, metals, and glasses, in various forms, such as substrates, powders, fibers, crystals, and preformed parts.

The highly cross-linked polymer coatings on the article may be pyrolyzed at a sufficient temperature and pressure for a sufficient time to form a boron nitride coating on the article.

The chloroborazene composition of the invention comprises B-trichloroborazine $(ClBNH)_3$ or 1-B-dialkylamino,3,5-B dichloroborazine $(R_2NB)(BCl)_2(NH)_3$, wherein R comprises an alkyl group, such as methyl, ethyl, or iso-propyl. The composition further comprises ammonia and a solvent, preferably selected from organic solvents, such as chlorocarbons, ethers, polyethers, or arenes. The composition further comprises a cross-linking agent, preferably a silylamine compound having the general formula $[(CH_3)_3Si]_2NR$, wherein R represents hydrogen or methyl, such as hexamethyldisilizane, $[(CH_3)_3Si]_2NH$, or heptamethyldisilizane, $[(CH_3)_3Si]_2N(CH_3)$. The composition may further comprise a dopant.

The process of the invention for producing a polymer precursor composition useful for the formation of a boron nitride coating, comprises the following steps:
  a) obtaining a chloroborazine compound, as set forth above;
  b) dissolving the chloroborazine compound in a solvent;
  c) adding a cross-linking agent to the mixture;
  d) adding nitrogen hydride to the mixture; and
  e) heating the mixture to produce a polymeric solid, useful as a coating material for the formation of a boron nitride coating.

In the preferred embodiment, volatiles are preferably removed from the mixture prior to step d) and the mixture is heated in step e) to at least approximately $300°$ C.

The invention further comprises a process of using a polymer precursor for the formation of a boron nitride coating on an article comprising the following steps:
  a) producing a polymeric solid, useful as a coating material for the formation of boron nitride, as set forth above; and
  b) coating the article with the polymeric solid.

The article preferably comprises oxides, non-oxides, metals, and glasses, in various forms, such as substrates, powders, fibers, crystals, and preformed parts.

The invention further comprises the steps of pyrolizing the polymeric solid coating material on the article at a sufficient temperature and pressure for a sufficient time to form a boron nitride coating on the article, to obtain an amorphous boron nitride coating, a crystalline alpha boron nitride coating (a temperature of at least approximately $1200°$ C.), or a crystalline beta boron nitride coating (at high temperature and pressures, preferably in the presence of a catalyst, or by adding the catalyst to the reaction mixture prior to pyrolysis). The resulting boron nitride coated article may be carbon free.

It is a primary object of the present invention to provide boron nitride coating precursor compositions which can be used to coat a wide variety of article materials and shapes.

It is another object of the present invention to provide boron nitride coating precursor compositions which can be stored for a long period of time, prior to conversion to boron nitride.

Yet another object of the present invention is to provide processes for making boron nitride coating precursor compositions, which are easy and inexpensive.

Still another object of the present invention is to provide coating compositions which are easy to apply to articles and convert to boron nitride.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE PREFERRED EMBODIMENTS OF THE INVENTION

The present invention provides several compositions and methods or processes for producing boron nitride, and includes boron nitride products, substrates, and articles coated with these compositions. The invention is useful in the production of amorphous (non-crystalline) boron nitride, crystalline alpha (also designated as hexagonal and α) boron nitride, and crystalline beta (also designated as cubic and β) boron nitride.

The invention comprises the formation of boron nitride films by applying a polymer that melts at a high temperature on a substrate. This provides several advantages. First, unlike low temperature melt polymers, polymers melting at high temperatures tend to be free of major amounts of gaseous decomposition products which may create bubbles and other defects in a crystalline boron nitride coating. Further, such a polymer can be applied to substrates by several simple techniques, including solution, slurry or melt techniques.

The invention comprises two general synthetic approaches. In the first approach, lightly cross-linked polymeric precursors are formed directly by treatment of tri-substituted borazine compounds with nitrogen hydrides, such as ammonia ($NH_3$), hydrazine ($N_2H_4$), and disilylhydrazine [$Me_3SiN(H)$—$N(H)(SiMe_3)$]. The lightly cross-linked polymers are further cross-linked by heating to an intermediate temperature, and the resulting highly cross-linked polymers are applied by simple physical contact as a fine, non-crystalline powder to substrates or articles. The highly cross-linked polymers are then heated to a high temperature, whereupon the polymers melt, wet the substrate and deposit as boron nitride. Alternatively, in a second approach, chloroborazine compounds are cross-linked with a silylamine compound preferably in an organic solvent, and the resulting solutions, containing borazinyl polymer, are applied to a substrate or article by various classical liquid coating methods (e.g., spin coating and dip coating). The polymer coatings are then converted to boron nitride by pyrolysis in ammonia. As used throughout the specification and claims, the term "polymer" is also intended to include "oligomer" and means a plurality of monomer units.

In the preferred embodiment of the invention, the tri-substituted broazine compound comprises tris-dialkylamino borazine ($R_2NBNH)_3$, wherein R preferably comprises methyl, ethyl or iso-propyl; or tris-alkylsulfido borazine ($RSBNH)_3$, wherein R preferably comprises methyl or ethyl. The tri-substituted borazine compound is preferably dissolved in a solvent, most preferably an organic solvent. Useful solvents include, but are not limited to chlorocarbons, ethers, arenes and hydrocarbons. Excess nitrogen hydride (preferably four of more equivalents), such as ammonia, hydrazine, and N,N' disilylhydrazine, at a preferred temperature of $-80°$ C. to $25°$ C., and most preferably at $-78°$ C., is then transferred to the solution. (As can be appreciated by one skilled in the art, the temperature range is dependent on the reaction mixture, particularly the nitrogen hydrides and the solvents, which should be in a liquid or gaseous state. The temperature of $-78°$ C. is the standard temperature of dry ice. Most solvents useful in accordance with the invention are in a liquid state at temperatures of between $-80°$ C. and $-35°$ C.) The resulting transmination products are believed to be tris-amino borazine [($H_2N)BNH]_3$, tris-hydrazino borazine [$H_2NN(H)BNH]_3$, or tris-silylhydrazine borazine [($Me_3Si)(H)NN(H)BNH]_3$. The monomers are unstable, and upon standing in the solvent, the monomers partially or incompletely cross-link and solid, lightly cross-linked, polymeric compounds precipitate from the organic solvent. The resulting solid polymers are preferably collected by filtration and washed with fresh solvent. As the polymers slowly react with moist air, they should be protected from reactive atmospheres.

Further cross-linking of the polymers to form highly cross-linked, solid polymeric ceramics are completed by heating at a sufficient temperature and pressure for a sufficient time, preferably between approximately $300°$ C. to $900°$ C. for between approximately 2-12 hours. It is preferred that the pyrolysis be accomplished in vacuo, although the same result is obtained by pyrolysis under a flowing stream of non-reactive gas, such as, for example, nitrogen or argon. The products obtained from the pyrolysis are highly cross-linked solid polymers which are stable in air and can be stored. Heating the polymers to higher temperatures, preferably above $900°$ C., results in the formation of polymeric melts that convert to boron nitride at even higher temperatures, preferably above $1200°$ C. (for conversion to crystalline hexagonal boron nitride), with minimal gas evolution. Pyrolysis at the higher temperature is conducted preferably for at least 30 minutes, and most preferably for at least ten hours.

The above process, using tris-dialkylamino borazine and ammonia for purposes of illustration, is as follows:

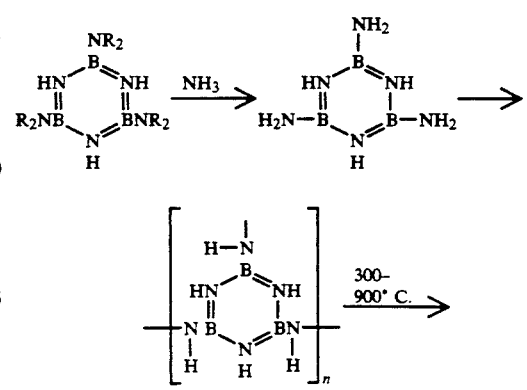

highly crosslinked $\xrightarrow{1200° C.}$ BN
polymer coating

If it is desired to store the precursors or delay the formation of crystalline boron nitride (e.g. to allow shipping of the precursor materials for subsequent coating on articles or substrates), the precursors, comprising the lightly cross-linked tris-amino borazine, tris-hydrazino borazine, and tris-silylhydrazino borazine precipitates, can be heated to approximately 300° C. or higher to produce stable, highly cross-linked, solid polymer reagents which can be stored and then pyrolyzed to boron nitride when convenient. The lightly cross-linked polymers or the air-stable, highly cross-linked solid polymers may be utilized to apply a crystalline boron nitride coating on substrates or articles.

In an alternative embodiment of the invention, a chloroborazine compound is dissolved in an organic solvent, such as, for example, diethyl ether, other higher molecular weight ethers, polyethers, arenes, or chlorocarbons. The solution is cooled, preferably to a temperature of between approximately −80° C. and 0° C., and most preferably to a temperature of −78° C. (the temperature of dry ice). A cross-linking agent, such as silylamine compound is added to the solution and the mixture allowed to warm, preferably to a temperature of between approximately 20° C. and 40° C., and most preferably to a temperature of 25° C. Removal of the volatiles produces a white solid polymer. The polymer is washed with excess nitrogen hydride, in a liquid or gaseous state. This treatment serves to cleave silyl end blocking groups from the polymer, resulting in a polymer that displays little weight loss upon heating to high temperatures. The resulting solid polymer is heated to an intermediate temperature, preferably between approximately 600° C. and 900° C., leaving a polymeric white solid which could be applied as a powder to forms and substrates, as described above. The polymer coated substrate or article is then heated to a higher temperature, preferably above approximately 1200° C. (for the formation of crystalline hexagonal boron nitride), whereupon the polymer melts and deposits on the substrate. Borazine compounds, useful in accordance with the invention, include B-trichloroborazine (ClBNH)$_3$ and 1-B-dialkylamino,3,5-B dichloroborazine (R$_2$NB)(BCl)$_2$(NH)$_3$, wherein R comprises methyl, ethyl, or iso-propyl. The preferred cross-linking agent, useful in accordance with the invention for cross-linking with the chloroborazine compounds of the invention, comprises a silylamine, having the general formula [R'$_3$Si]$_2$NR", wherein R' represents methyl, ethyl, and phenyl, and R" represents an alkyl or aryl group. The preferred silylamines are hexamethyldisilizane, [(CH$_3$)$_3$Si]$_2$NH, and heptamethyldisilizane, [(CH$_3$)$_3$Si]$_2$N(CH$_3$). The above process, using B-trichloroborazine and hexamethyl disilizane for purposes of illustration, is as follows:

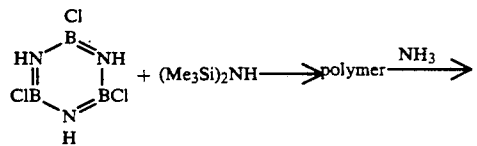

$\xrightarrow{600-900° C.}$ highly crosslinked $\longrightarrow$ BN
polymer coating The resulting polymers are soluble in organic solvents, such as, for example, ethers, polyethers, chlorocarbons, and arenes. Solutions of the polymer may be applied to metal oxide forms or articles by classical solution coating technologies (e.g., dip coating and spin coating). The solvent may be removed by evaporation. Pyrolysis, preferably under ammonia, results in forms coated with boron nitride. The pyrolysis preferably occurs at approximately 1200° C. or higher to produce crystalline α-boron nitride.

The highly cross-linked, solid polymers may be applied to metal oxides or inorganic oxides, such as, for example, alumina (Al$_2$O$_3$), zirconia (ZrO$_2$), and magnesia (MgO), other oxides, and non-oxides, in any forms or substrates, including single crystals, powders, fibers, and preformed parts, by simply spreading the powder on the substrate or article, or by application of a nonaqueous slurry of the polymer on the substrate. The physically covered substrate is heated to approximately 1200° C. or higher to obtain crystalline alpha boron nitride. During the heating process, the polymer melts, the melt wets the substrate, and at about 1200° C. (for α-boron nitride), the polymer converts a boron nitride. A thin, chemically bonded coating (100 Å to 1000 Å) of boron nitride forms on the article surface. The coating is strongly adhesive and protective of the underlying material. Porous (non-dense) substrates or articles may also be treated with the polymer, and the melt formed above approximately 1000° C. permeates the internal structure of the substrate. The impregnating substrate filler may be converted to crystalline hexagonal boron nitride at temperatures above approximately 1200° C.

The boron nitride obtained in the procedure described above may be converted to crystalline cubic boron nitride by any of the standard high temperature/high pressure methodologies known in the art. Catalysts are typically mechanically mixed with crystalline α-boron nitride in the art to aid in the conversion of α- to β-boron nitride. One advantage of the present invention is that catalysts may be introduced homogeneously to the polymer reaction mixture. This in turn results in homogeneous inclusion of the catalyst in the boron nitride matrices, which may provide lower α-boron nitride to β-boron nitride transformation conditions.

Dopants, for example phosphorus, sulfur, silicon, and other main group and transition metal elements, may be incorporated in the starting reaction mixture by introducing the dopant elements in the borazine ring or in the cross-linking agent and these are retained, in some cases, in the final ceramic product in a highly dispersed state. Dopants modify the properties of the boron nitride in specific ways.

The use of the above described compositions and processes result in a pure source of boron nitride. In particular, boron nitride may be obtained that does not contain carbon because of the absence of this element in the selected precursor materials. Moreover, the boron nitride does not contain halides, such as in many prior art processes.

One advantage of using the foregoing compositions and methods of the invention, as compared to prior art processes, is that the compositions have liquid properties which allow them to be applied as films or coatings on oxide, non-oxide, glass and metal substrates, as well as other forms. This compares to the prior art in which vapor deposition processes are used; such processes are limited in application by the few useful gas phase reagents available. In addition, the high temperature stability of some films produced by vapor deposition techniques is less than the stability of the coatings produced by this method. Articles requiring a boron nitride coating can be coated, in accordance with the invention.

The invention is further illustrated by the following non-limiting examples.

EXAMPLE I

A sample (9.25 g, 43.5 mmole) of 2,4,6-tris(dimethylamino)borazine was dissolved in 50 ml of dry toluene, and the reaction mixture was cooled to $-78°$ C. Excess dry ammonia (approximately 10 ml, required 2.9 ml) was added to the cold solution, and the mixture was stirred for five hours. The resulting mixture was warmed to $25°$ C. and the excess $NH_3$ allowed to escape from the reaction vessel. The resulting compound, $[H_2NBNH]_3$, was not isolated. The reaction mixture was then refluxed under dry nitrogen for five hours, and a white precipitate formed. The mixture was cooled, filtered, and the white, insoluble polymeric product was washed with 10 ml of toluene, yielding 3.55 g. A sample of the white polymer (3.0 g) was heated at between $300°$ C. and $900°$ C., and the volatile by-products were removed by vacuum evaporation. This material was suitable for application to substrates as a powder coating.

EXAMPLE II

A sample (10.0 g, 47.0 mmole) of 2,4,6-tris-(dimethylamino) borazine was dissolved in 50 ml of anhydrous diethyl ether and the reaction mixture was cooled to $-78°$ C. Excess hydrazine (4.5 g, 141 mmole) was added to the cold solution and the mixture stirred for four hours. The resulting mixture was warmed to $25°$ C. and the excess hydrazine allowed to escape. The resulting compound, $[H_2NN(H)BNH]_3$, was not isolated. The mixture produced a precipitate which was collected by filtration and washed with fresh ether. The precipitate was dried by vacuum evaporation, heated at $300°$ C. to $900°$ C. and the volatile byproducts removed by vacuum evaporation. This material was suitable for application of coatings.

EXAMPLE III

B-trichloroborazine $(ClBNH)_3$ (37 g, 201 mmole) was dissolved in 370 ml anhydrous diethyl ether, and the solution was cooled to $-78°$ C. Hexamethyl disilizane (48.7 g, 302 mmole) was added to the solution in one portion, and the reaction vessel was shaken to ensure mixing. It was then allowed to warm slowly to $25°$ C., and volatiles were removed in vacuo. This left a white polymeric solid. The reaction vessel containing the polymer was fitted with a dry ice condenser, and excess liquid ammonia (dried over Na) was condensed into the vessel. A colorless solution resulted. The $NH_3$ was allowed to evaporate, leaving a foamy, solid polymer (25.8 g). The polymer was then heated in vacuo at $900°$ C. for 12 hours. The resulting solid (15.6 g) was amorphous. For coatings, this residue was mixed with the substrate and heated in a Pt crucible at $1200°$ C. under $N_2$.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A process for the pyrolytic conversion of a polymeric precursor composition to boron nitride comprising the following steps:
   (a) obtaining a borazine compound having a general formula selected from the group consisting of tris-dialkylamino borazines $(R_2NBNH)_3$; tris-alkylsulfide borazines $(RSBNH)_3$; B-trichloroborazine $(ClBNH)_3$; and 1-B-dialkylamino,3,5-B dichloroborazine $(R_2NB)(BCl)_2(NH)_3$; wherein R is an alkyl group and wherein boron atoms are not bonded to hydrogen atoms;
   (b) dissolving the borazine compound in a solvent in the presence of a cross-linking agent to from an insoluble, solid polymer wherein boron atoms are not bonded to hydrogen atoms and wherein there are no direct N(ring)-B(ring) bonds;
   (c) removing substantially all the solvent from the insoluble solid polymer;
   (d) applying the insoluble, solid polymer as a dry coating to an article; and
   (e) converting the polymer to boron nitride by pyrolysis.

2. The process of claim 1 wherein the R alkyl group is a member selected from the group consisting of methyl, ethyl, and iso-propyl.

3. The process of claim 1 wherein the solvent comprises an organic solvent.

4. The process of claim 3 wherein the solvent comprises at least one member selected from the group consisting of chlorocarbons, ethers, arenes, and hydrocarbons.

5. The process of claim 1 wherein the cross-linking agent comprises excess nitrogen hydride.

6. The process of claim 5 wherein the nitrogen hydride comprises at least one member selected from the group consisting of ammonia, hydrazine and N,N' disilylhydrazine.

7. The process of claim 5 wherein the nitrogen hydride is added to the solvent mixture at a temperature of between approximately $-80°$ C. and $25°$ C.

8. The process of claim 1 wherein the cross-linking agent comprises a silylamine compound.

9. The process of claim 8 wherein the silylamine compound has the general formula $[(CH_3)_3Si]_2NR$, and wherein R represents one member selected from the group consisting of hydrogen and methyl.

10. The process of claim 9 wherein the silylamine compound comprises hexamethyldisilizane, $[(CH_3)_3Si]_2NH$.

11. The process of claim 9 wherein the silylamine compound comprises heptamethyldisilizane, $[(CH_3)_3Si]_2N(CH_3)$.

12. The process of claim 1 further comprising the step of filtration of the reaction mixture produced in step (c) to collect the polymer.

13. The process of claim 12 further comprising the step of washing the collected polymer with a fresh solvent.

14. The process of claim 1 wherein, prior to step (e), the polymer is heated at approximately the solvent reflux temperature.

15. The process of claim 1 wherein the solvent is substantially removed by at least one method selected from the group consisting of decantation, vacuum evaporation, sol-gel techniques, and aerogel techniques.

16. The process of claim 1 wherein the polymer is pyrolyzed in step (e) at a sufficient temperature and pressure for a sufficient time to obtain amorphous boron nitride.

17. The process of claim 16 wherein the polymer is pyrolyzed in step (e) at a temperature of between approximately 300° C. and 900° C. to obtain amorphous boron nitride.

18. The process of claim 16 wherein the amorphous boron nitride is further pyrolyzed at a sufficient temperature and pressure for a sufficient time to obtain crystalline hexagonal boron nitride.

19. The process of claim 1 wherein the polymer is pyrolyzed in step (e) at a sufficient temperature and pressure for a sufficient time to obtain crystalline hexagonal boron nitride.

20. The process of claim 19 wherein the polymer is pyrolyzed in step (e) at a temperature of at least 1200° C. to obtain crystalline hexagonal boron nitride.

21. The process of claim 1 wherein the polymer is pyrolyzed in step (e) at a sufficient temperature and pressure for a sufficient time to obtain crystalline cubic boron nitride.

22. The process of claim 21 wherein the polymer is pyrolized in step (e) in the presence of a catalyst to obtain crystalline cubic boron nitride.

23. The process of claim 1 wherein a catalyst is added to the polymer prior to step (e).

24. The process of claim 1 wherein, prior to step (e), at least one dopant is added to the polymer.

25. The process of claim 1 wherein the resulting boron nitride product is free of carbon impurities.

26. The process of claim 1 wherein the pyrolysis in step (e) is conducted in the absence of air.

27. The process of claim 25 wherein the pyrolysis in step (e) is conducted in the absence of air.

28. The process of claim 1 wherein the pyrolysis in conducted in the presence of at least one gas selected from the group consisting of $N_2$, $NH_3$, and an inert gas.

29. The process of claim 1 wherein the article comprises at least one material selected from the group consisting of oxides, non-oxides, metals, and glasses.

30. The process of claim 1 wherein the article comprises at least one substrate selected from the groups consisting of powders, fibers, crystals, and preformed parts.

31. The process of claim 1 wherein the polymer is converted to boron nitride by pyrolysis in the absence of a catalyst.

* * * * *